(12) United States Patent
Yukimasa et al.

(10) Patent No.: US 8,241,807 B2
(45) Date of Patent: Aug. 14, 2012

(54) FUEL CELL SYSTEM

(75) Inventors: Akinori Yukimasa, Osaka (JP); Masataka Ozeki, Osaka (JP); Hideo Ohara, Osaka (JP); Akinari Nakamura, Osaka (JP)

(73) Assignee: Panasonic Corporation, Osaka (JP)

( * ) Notice: Subject to any disclaimer, the term of this patent is extended or adjusted under 35 U.S.C. 154(b) by 637 days.

(21) Appl. No.: 12/439,972

(22) PCT Filed: Sep. 21, 2007

(86) PCT No.: PCT/JP2007/068445
§ 371 (c)(1),
(2), (4) Date: Mar. 4, 2009

(87) PCT Pub. No.: WO2008/041528
PCT Pub. Date: Apr. 10, 2008

(65) Prior Publication Data
US 2010/0183934 A1    Jul. 22, 2010

(30) Foreign Application Priority Data
Sep. 26, 2006  (JP) .................. 2006-260499

(51) Int. Cl.
H01M 8/04 (2006.01)
H01M 2/12 (2006.01)

(52) U.S. Cl. ........... 429/437; 429/71; 429/433; 429/436

(58) Field of Classification Search .............. 429/71, 429/433, 436, 437
See application file for complete search history.

(56) References Cited

U.S. PATENT DOCUMENTS
4,456,172 A    6/1984   Roffelsen
2006/0035127 A1*  2/2006   Grasso ................ 429/26

FOREIGN PATENT DOCUMENTS

| CN | 2499825 Y | 7/2002 |
|---|---|---|
| JP | 02-197057 | 8/1990 |
| JP | 10-334934 | 12/1998 |
| JP | 11-013633 | 1/1999 |
| JP | 2003-193984 | 7/2003 |
| JP | 2003-223913 | 8/2003 |
| JP | 2006-107893 | 4/2006 |
| JP | 2006-228606 | 8/2006 |
| JP | 2006-228613 | 8/2006 |

OTHER PUBLICATIONS

English translation of Chinese Office Action issued in Chinese Patent Application No. CN 200780031127.8 dated Jul. 7, 2010.
Supplementary European Search Report issued in European Patent Application No. 07 80 7776, dated Jul. 26, 2010.

* cited by examiner

*Primary Examiner* — Patrick Ryan
*Assistant Examiner* — Julian Anthony
(74) *Attorney, Agent, or Firm* — McDermott Will & Emery LLP

(57) ABSTRACT

A fuel cell system includes: a fuel cell (1) configured to generate electric power by a reaction between fuel and an oxidizing agent; a cooling passage (3) through which a first heat medium for cooling down the fuel cell (1) flows; a heat exchanger (5) disposed on the cooling passage (3); and an exhaust heat recovery passage (7) through which a second heat medium which exchanges heat with the first heat medium by the heat exchanger (5) flows, wherein a deceleration portion (7c) configured to reduce a flow velocity of the second heat medium and a bubble release portion (7d) configured to discharge bubbles in the deceleration portion (7c) to an outside of the exhaust heat recovery passage (7) are disposed on the exhaust heat recovery passage (7).

13 Claims, 2 Drawing Sheets

| FLOW RATE (L/min) | 0.0 | | 0.5 | |
|---|---|---|---|---|
| INTERNAL DIAMETER OF PIPE | FLOW OF BUBBLES | FLOW VELOCITY (m/sec) | FLOW OF BUBBLES | FLOW VELOCITY (m/sec) |
| 5mm | ○ | 0.000 | × | 0.425 |
| 10mm | ○ | 0.000 | ○ | 0.106 |

○: DENOTES THAT BUBBLES MOVE UP AGAINST FLOW OF WATER

×: DENOTES THAT BUBBLES MOVE DOWN BY FLOW OF WATER

Fig. 2

FUEL CELL SYSTEM

RELATED APPLICATIONS

This application is the U.S. National Phase under 35 U.S.C. §371 of International Application No. PCT/JP2007/068445, filed on Sep. 21, 2007, which in turn claims the benefit of Japanese Application No. 2006-260499, filed on Sep. 26, 2006, the disclosures of which Applications are incorporated by reference herein.

TECHNICAL FIELD

The present invention relates to a fuel cell system.

BACKGROUND ART

A fuel cell system is a system which generates electric power by an electrochemical reaction between fuel and an oxidizing agent supplied to a fuel cell from the outside of the fuel cell system, recovers heat generated by the reaction, stores the heat as hot water, and effectively utilizes the hot water for heat supply to the outside of the fuel cell system. Specifically, cooling water is supplied to the fuel cell, and the supplied cooling water carries out heat exchange in the fuel cell to be heated and then discharged from the fuel cell. Then, the discharged cooling water exchanges heat with a heat medium (water) in a heat exchanger to be cooled down, and again, is supplied to the fuel cell.

Meanwhile, the heat medium which has carried out the heat exchange in the heat exchanger is further heated by an electric heater and is stored in a hot water tank. At this time, the problem arises where dissolved oxygen in the heat medium becomes bubbles, the bubbles deteriorate the performance of a pump disposed on an exhaust heat recovery passage through which the heat medium flows, and this disturbs control of water delivery.

To solve the above problem, a fuel cell power generating system in which an air release valve is disposed on a circulation passage (exhaust heat recovery passage) is known (see Patent Document 1 for example). In the fuel cell power generating system disclosed in Patent Document 1, since the air release valve is disposed on a hot water circulation passage including the heat exchanger and the fuel cell, the bubbles generated in the circulation passage can be removed.

Patent Document 1: Japanese Laid-Open Patent Application Publication 2003-223913

DISCLOSURE OF THE INVENTION

Problems to be Solved by the Invention

However, in the fuel cell power generating system disclosed in Patent Document 1, the flow velocity of the hot water flowing through the circulation passage is not considered. In a case where the flow velocity of the hot water flowing through the circulation passage is high, a force applied to the bubble by the hot water in a flow direction of the hot water is stronger than a buoyant force of the bubble. Therefore, the bubbles are not discharged from the air release valve but keep flowing through the circulation passage. This causes the problems that a passage resistance in the circulation passage increases since the bubbles remain in the circulation passage, and that the performance of the pump deteriorates since the bubbles enter into the pump from the circulation passage.

The present invention was made to solve the above problems, and an object of the present invention is to provide a fuel cell system which is simple in configuration, can surely remove the bubbles generated in the exhaust heat recovery passage, and can operate safely.

Means for Solving the Problems

In order to solve the above problems, a fuel cell system of the present invention includes: a fuel cell configured to generate electric power by a reaction between fuel and an oxidizing agent; a cooling passage through which a first heat medium for cooling down the fuel cell flows; a heat exchanger disposed on the cooling passage; and an exhaust heat recovery passage through which a second heat medium which exchanges heat with the first heat medium by the heat exchanger flows, wherein a deceleration portion configured to reduce a flow velocity of the second heat medium and a bubble release portion configured to discharge bubbles in the deceleration portion to an outside of the exhaust heat recovery passage are disposed on the exhaust heat recovery passage.

With this, the fuel cell system of the present invention can surely remove the bubbles generated in the exhaust heat recovery passage and operate safely while having a simple configuration.

In the fuel cell system of the present invention, the bubble release portion may be provided downstream of the heat exchanger.

The fuel cell system of the present invention may further include a heater configured to heat the second heat medium flowing through the exhaust heat recovery passage, wherein the bubble release portion may be provided downstream of a portion of the exhaust heat recovery passage which portion is heated by the heater.

In the fuel cell system of the present invention, the deceleration portion may be constituted by a portion of the exhaust heat recovery passage which portion extends downward in a vertical direction and through which the second heat medium flows downward, and a cross-sectional area of the portion of the exhaust heat recovery passage may be larger than a cross-sectional area of a portion located upstream of the portion of the exhaust heat recovery passage and a cross-sectional area of a portion located downstream of the portion of the exhaust heat recovery passage.

In the fuel cell system of the present invention, the bubble release portion may be provided above the deceleration portion.

In the fuel cell system of the present invention, the deceleration portion may be configured such that the flow velocity of the second heat medium is $1.06 \times 10^{-1}$ m/sec or lower in at least a part of the deceleration portion.

In the fuel cell system of the present invention, a portion of the exhaust heat recovery passage which portion is a portion other than the deceleration portion and extends downward may be configured such that the flow velocity of the second heat medium is $4.25 \times 10^{-1}$ m/sec or higher.

In the fuel cell system of the present invention, the second heat medium may be water, and the fuel cell system of the present invention may further include a hot water tank configured to store the second heat medium which has exchanged heat with the first heat medium by the heat exchanger.

Moreover, in the fuel cell system of the present invention, the heater may be a surplus electric power heater configured to use surplus electric power generated by the fuel cell; the deceleration portion may be a buffer portion configured to suppress an increase in temperature of the second heat medium heated by the surplus electric power heater; the buffer portion may be located downstream of a portion of the exhaust heat recovery passage which portion is heated by the surplus electric power heater; and a cross-sectional area of the buffer portion may be larger than a cross-sectional area of the exhaust heat recovery passage located upstream of the buffer portion.

Effects of the Invention

The fuel cell system of the present invention can reduce the bubbles generated in the exhaust heat recovery passage and operate safely while having a simple configuration.

BRIEF DESCRIPTION OF THE DRAWINGS

FIG. 2 is a table showing results obtained by measuring the flow velocity of a second heat medium and the flow of bubbles flowing through a deceleration portion 7c and a portion 7e while changing an internal diameter of a pipe constituting an exhaust heat recovery passage 7.

Figure 1:
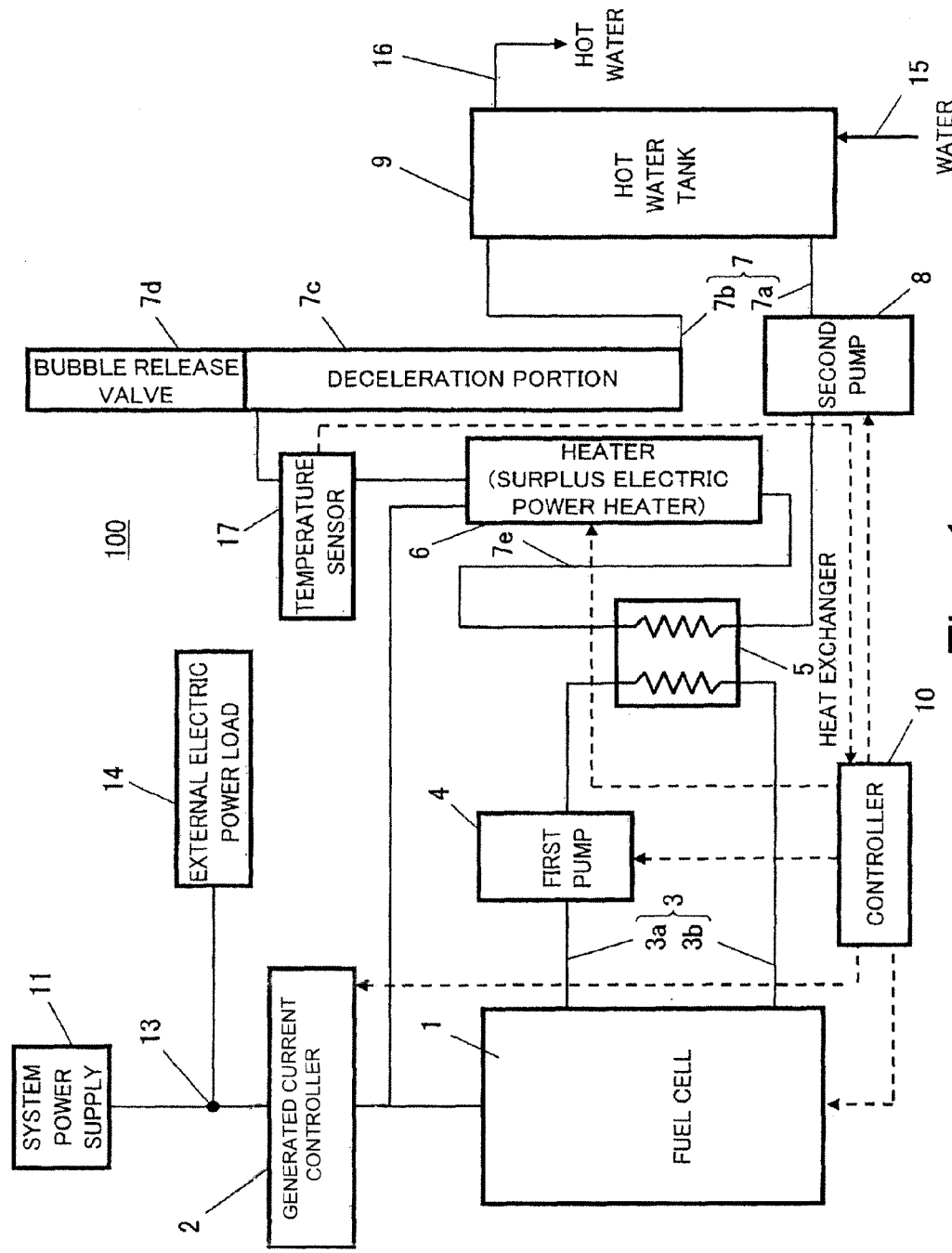
FIG. 1 is a block diagram schematically showing the configuration of a fuel cell system according to Embodiment 1 of the present invention.

| Explanation of Reference Numbers | |
| --- | --- |
| 1 | fuel cell |
| 2 | generated current controller |
| 3 | cooling passage |
| 3a | cooling outward route |
| 3b | cooling return route |
| 4 | first pump |
| 5 | heat exchanger |
| 6 | heater (surplus electric power heater) |
| 7 | exhaust heat recovery passage |
| 7a | exhaust heat recovery outward route |
| 7b | exhaust heat recovery return route |
| 7c | deceleration portion |
| 7d | bubble release valve |
| 7e | portion |
| 8 | second pump |
| 9 | hot water tank |
| 10 | controller |
| 11 | system power supply |
| 12 | output wire |
| 13 | system connecting point |
| 14 | external electric power load |
| 15 | water supplying pipe |
| 16 | hot water supplying pipe |
| 17 | temperature sensor |

BEST MODE FOR CARRYING OUT THE INVENTION

Hereinafter, a preferred embodiment of the present invention will be explained in reference to the drawings.

Embodiment 1

FIG. 1 is a block diagram schematically showing the configuration of a fuel cell system according to Embodiment 1 of the present invention.

First, the configuration of the fuel cell system according to Embodiment 1 will be explained.

As shown FIG. 1, a fuel cell system 100 according to Embodiment 1 includes a fuel cell 1, a generated current controller 2, a cooling passage 3, a first pump 4, a heat exchanger 5, a heater (surplus electric power heater) 6, an exhaust heat recovery passage 7, a second pump 8, a hot water tank 9, and a controller 10.

In the fuel cell 1, hydrogen-containing fuel supplied from a fuel supplier (not shown) and an oxygen-containing oxidizing agent supplied from an oxidizing agent supplier (not shown) electrochemically react with each other to generate water, heat, and electricity. Moreover, the generated current controller 2 is connected to an output terminal, not shown, of the fuel cell 1.

The generated current controller 2 controls current output to the outside of the fuel cell system 100. Herein, since the fuel cell 1 generates DC power, the generated current controller 2 includes an inverter which converts the DC power generated by the fuel cell 1 into AC power. One end of an output wire 12 is connected to an output terminal (not shown) of the generated current controller 2, and a system connecting point 13 is formed at the other end of the output wire 12.

Then, a system power supply 11 is connected to the system connecting point 13 by a suitable wire, and the generated current controller 2 and the system power supply 11 are interconnected by the system connecting point 13. In addition, an external electric power load 14 is connected to the system connecting point 13 by a suitable wire. Further, the heater (surplus electric power heater) 6 is connected to the fuel cell 1 by a suitable wire. Herein, the external electric power load 14 is assumed to be an electric power consumption device used in general households. In addition, a known electric heater, such as a sheath heater, is used as the surplus electric power heater 6.

The controller 10 is constituted by a computer, such as a microcomputer, and includes a calculation processing portion, such as a CPU, a storage portion, such as a memory, a display portion, such as a monitor, a timer portion having a calendar function, and an operation input portion, such as a keyboard (all of which are not shown). The calculation processing portion reads out and executes a predetermined control program stored in the storage portion to control various operations of the fuel cell system 100. Moreover, the calculation processing portion processes data stored in the storage portion and data input from the operation input portion. Further, in a case where the electric power generated by the fuel cell 1 is larger than the electric power consumed by the external electric power load 14 (in a case where surplus electric power remains), the controller 10 supplies the surplus electric power to the surplus electric power heater 6. Thus, it is possible to save energy by storing the surplus electric power as heat energy.

The cooling passage 3 is connected to the fuel cell 1, and the first pump 4 is disposed on a portion of the cooling passage 3. The cooling passage 3 is constituted by a cooling outward route 3a and a cooling return route 3b. An upstream end and downstream end of the cooling outward route 3a are connected to a heat medium supply port (not shown) of the fuel cell 1 and an outlet port (not shown) of the first pump 4, respectively. Moreover, an upstream end and downstream end of the cooling return route 3b are connected to a heat medium exhaust port (not shown) of the fuel cell 1 and an inlet port (not shown) of the first pump 4. Then, a primary passage of the heat exchanger 5 is inserted between two portions of the cooling return route 3b.

The first pump 4 is a pump capable of adjusting the flow rate, and causes a first heat medium (herein, water) to circulate between the fuel cell 1 and the heat exchanger 5 through the cooling passage 3. With this, an inside of the fuel cell 1 is maintained at a temperature suitable for electric power generation. Instead of the first pump 4, a pump and a flow control device, such as a flow control valve, may be used to adjust the flow rate of the first heat medium flowing through the cooling passage 3.

An entrance portion and exit portion of a secondary passage of the heat exchanger 5 are connected to an exhaust heat recovery outward route 7a of the exhaust heat recovery passage 7 and an exhaust heat recovery return route 7b of the exhaust heat recovery passage 7. Specifically, a downstream end of the exhaust heat recovery outward route 7a is connected to the entrance portion of the secondary passage of the heat exchanger 5, and an upstream end of the exhaust heat recovery return route 7b is connected to the exit portion of the secondary passage of the heat exchanger 5. Then, an upstream end of the exhaust heat recovery outward route 7a is connected to a lower portion of the hot water tank 9, and a downstream end of the exhaust heat recovery return route 7b is connected to an upper portion of the hot water tank 9.

The heater (surplus electric power heater) 6 is disposed on the exhaust heat recovery passage 7 (exhaust heat recovery return route 7b) so as to be provided downstream of the heat exchanger 5. The surplus electric power heater 6 is configured to be able to adjust its heating power by a control signal transmitted from the controller 10, and heats a second heat medium (herein, water) flowing through the exhaust heat recovery return route 7b.

Further, the second pump 8 is disposed on a portion of the exhaust heat recovery passage 7. A pump capable of adjusting the flow rate is used as the second pump 8. By the operation of the second pump 8, a part of the second heat medium stored in the hot water tank 9 is supplied through the exhaust heat recovery passage 7 (to be precise, the exhaust heat recovery outward route 7a) to the heat exchanger 5. In the heat exchanger 5, the second heat medium exchanges heat with the first heat medium flowing through the cooling passage 3. Then, the second heat medium which has exchanged heat with and has been heated by the first heat medium in the heat exchanger 5 is further heated by the surplus electric power heater 6, flows through the exhaust heat recovery return route 7b, and is stored in the hot water tank 9. Instead of the second pump 8, a pump and a flow control device, such as a flow control valve, may be used to adjust the flow rate of the second heat medium flowing through the exhaust heat recovery passage 7.

The hot water tank 9 is formed in a tubular shape, and is disposed such that a central axis thereof extends in a vertical direction. A water supplying pipe 15 through which city water is supplied is connected to a lower end of the hot water tank 9, and a hot water supplying pipe 16 through which hot water (heat medium) is supplied to a user is connected to an upper portion of the hot water tank 3. A heat load (not shown) which utilizes the hot water is connected to the hot water supplying pipe 16. Examples of the heat load are a water heater, a space heater, and an air conditioner.

The second heat medium is heated by the heat exchanger 5 and the surplus electric power heater 6, flows through the exhaust heat recovery return route 7b, and is stored in the hot water tank 9. However, in a case where dissolved oxygen in the second heat medium (water) heated as above becomes bubbles, and the bubbles remain in the exhaust heat recovery passage 7, a flow velocity resistance of the second heat medium flowing through the exhaust heat recovery passage 7 increases. Therefore, in the fuel cell system according to Embodiment 1, a deceleration portion 7c and a bubble release valve (bubble release portion) 7d are disposed on a pipe constituting the exhaust heat recovery passage 7 (to be precise, the exhaust heat recovery return route 7b) so as to be provided downstream of the surplus electric power heater 6.

The deceleration portion 7c is formed as a portion of the pipe constituting the exhaust heat recovery passage 7, which portion extends downward in the vertical direction and through which portion the second heat medium flows downward. The deceleration portion 7c is configured such that a cross-sectional area of the pipe constituting the deceleration portion 7c is larger than a cross-sectional area of a portion of the pipe which portion is located upstream of the deceleration portion 7c and a cross-sectional area of a portion of the pipe which portion is located downstream of the deceleration portion 7c. Then, the deceleration portion 7c is configured such that when the amount of the second heat medium flowing through the exhaust heat recovery passage 7 is maximum (for example, 0.5 L/min in the case of a household fuel cell system (1 kW)), the flow velocity of the second heat medium flowing through at least the deceleration portion 7c is $1.06 \times 10^{-1}$ m/sec or lower. With this, the buoyant force of the bubble becomes higher than the force applied to the bubble of the second heat medium by the second heat medium flowing through the deceleration portion 7c. Therefore, the bubbles can reach the bubble release valve 7d against the flow of the second heat medium, and are discharged from the bubble release valve 7d to the outside of the exhaust heat recovery passage 7.

Moreover, in a case where the exhaust heat recovery passage 7 includes a portion, other than the deceleration portion 7c, of the pipe constituting the exhaust heat recovery passage 7 which portion extends downward in the vertical direction and through which portion the second heat medium flows downward (for example, in a case where the exhaust heat recovery passage 7 includes a portion 7e), the exhaust heat recovery passage 7 is configured such that when the amount of the second heat medium flowing through the exhaust heat recovery passage 7 is minimum (for example, 0.1 L/min in the case of the household fuel cell system (300 W)), the flow velocity of the second heat medium flowing through the portion 7e is $4.25 \times 10^{-1}$ m/sec or higher. With this, when the second heat medium containing the bubbles flows downward in the vertical direction (flows downward in the portion 7e), the force applied to the bubble by the second heat medium is higher than the buoyant force of the bubble, so that the bubble can flow downward in the portion 7e by the flow of the second heat medium. Therefore, the bubbles do not remain at the upper portion of the portion 7e, and the flow velocity resistance of the second heat medium can be prevented from increasing.

Here, the flow velocity of the second heat medium in the fuel cell system 100 according to Embodiment 1 will be explained in further detail in reference to Test Example.

TEST EXAMPLE 1

In Test Example 1, the fuel cell system shown in FIG. 1 was configured in which the pipe constituting the exhaust heat recovery passage 7 was a transparent pipe. Then, the second pump 8 was controlled such that the second heat medium flows through the exhaust heat recovery passage 7 at a predetermined flow rate. With this, the flow velocity of the second heat medium and the flow of the bubbles flowing through the vertically-downward-extending portions of the pipe constituting the exhaust heat recovery passage 7, that is, the portions (the deceleration portion 7c and the portion 7e) through which the second heat medium flows downward were measured.

FIG. 2 is a table showing results obtained by carrying out the above test while changing the internal diameter of the pipe constituting the exhaust heat recovery passage 7. As shown in FIG. 2, when the flow velocity of the second heat medium was 0.106 m/sec, the bubbles moved up against the flow of the second heat medium, and when the flow velocity of the second heat medium was 0.425 m/sec, the bubbles moved down by the flow of the second heat medium.

In the fuel cell system, typically, the passage (herein, the exhaust heat recovery passage 7) through which the heat medium (herein, the second heat medium) which exchanges heat with the heat medium (herein, the first heat medium) for maintaining the temperature inside the fuel cell at a predetermined temperature flows is controlled such that the heat medium (herein, the second heat medium) flows at a predetermined flow rate corresponding to the output of the fuel cell.

Therefore, as described above, the portion 7e of the exhaust heat recovery passage 7 in the fuel cell system 100 according to Embodiment 1 is configured such that in order to prevent the bubbles from remaining in the portion 7e, the flow velocity of the second heat medium flowing through the portion 7e is $4.25 \times 10^{-1}$ m/sec or higher when the flow rate of the second heat medium flowing through the exhaust heat recovery passage 7 is minimum (for example, 0.1 L/min in the case of the household fuel cell system (300 W)). In contrast, the deceleration portion 7c of the exhaust heat recovery passage 7 in the fuel cell system 100 according to Embodiment 1 is configured such that in order to cause the bubbles to move up against the flow of the second heat medium, the flow velocity of the second heat medium flowing through at least the deceleration portion 7c is $1.06 \times 10^{-1}$ m/sec or lower when the flow rate of the second heat medium flowing through the exhaust heat recovery passage 7 is maximum (for example, 0.5 L/min in the case of the household fuel cell system (1 kW)).

Thus, the fuel cell system according to Embodiment 1 can reduce the bubbles generated in the exhaust heat recovery passage and operate safely while having a simple configuration.

Moreover, a temperature sensor 17 is provided downstream of the surplus electric power heater 6 on the exhaust heat recovery return route 7b. Herein, the temperature sensor 17 is a thermocouple, and is configured to detect the temperature of the second heat medium heated by the heat exchanger 5 and the surplus electric power heater 6 and transmit the detected temperature to the controller 10. Then, the controller 10 controls the fuel cell system 100 based on the temperature detected by the temperature sensor 17. Specifically, the controller 10 causes the second pump 8 to reduce the flow rate of the second heat medium flowing through the exhaust heat recovery passage 7 when the temperature detected by the temperature sensor 17 is higher than a predetermined first threshold stored in the storage portion. Then, the controller 10 stops the fuel cell system 100 when the temperature of the second heat medium detected after the flow rate of the second heat medium is reduced is higher than a predetermined second threshold stored in the storage portion.

With this, it is possible to prevent the second heat medium having an extremely high temperature from being supplied to the hot water tank 9. Moreover, by stopping the fuel cell system 100, it is possible to prevent the second heat medium from being extremely heated by the surplus electric power heater 6.

Normally, the fuel cell system is controlled to adjust the amount of electric power generation in accordance with a load change of the external electric power load 14. However, it is difficult to match the load change and the amount of electric power generation. Therefore, the electric power generated by the fuel cell 1 may become temporarily and excessively large, so that the surplus electric power may become excessively large. In this case, the second heat medium is excessively heated by the surplus electric power heater 6 to be extremely high in temperature by, for example, boiling. Even by the above control, the second heat medium having a high temperature may be supplied to the hot water tank 9.

However, in the fuel cell system 100 according to Embodiment 1, the cross-sectional area of the pipe constituting the deceleration portion 7c is larger than the cross-sectional area of the pipe located upstream of the deceleration portion 7c and the cross-sectional area of the pipe located downstream of the deceleration portion 7c (to be precise, larger than the cross-sectional area of the pipe located in the vicinity of the deceleration portion 7c), and the deceleration portion 7c functions as a buffer portion 7c which suppresses the increase in temperature of the second heat medium having been heated by the surplus electric power heater 6. With this configuration, in a case where the second heat medium is excessively heated by the surplus electric power heater 6 to which the surplus electric power is excessively supplied, and the excessively heated second heat medium flows through the exhaust heat recovery return route 7b and reaches the deceleration portion (buffer portion) 7c, the heat of the excessively heated second heat medium is transferred to the second heat medium existing in the buffer portion 7c, and therefore, the steep temperature increase of the second heat medium is suppressed. With this, it is possible to reduce the possibility that the second heat medium having an excessively high temperature is supplied to the hot water tank 9.

Thus, when the surplus electric power excessively remains, the fuel cell system 100 according to Embodiment 1 can reduce the possibility that the high-temperature second heat medium excessively heated by the surplus electric power heater 6 is supplied to the hot water tank 9.

Industrial Applicability

The fuel cell system of the present invention is useful as a fuel cell system capable of reducing the bubbles generated in the exhaust heat recovery passage and operating safely while having a simple configuration.

The invention claimed is:

1. A fuel cell system comprising:
   a fuel cell configured to generate electric power by a reaction between fuel and an oxidizing agent;
   a cooling passage through which a first heat medium for cooling down the fuel cell flows;
   a heat exchanger disposed on the cooling passage; and
   an exhaust heat recovery passage through which a second heat medium which exchanges heat with the first heat medium by the heat exchanger flows, wherein
   a deceleration portion configured to reduce a flow velocity of the second heat medium and a bubble release portion configured to discharge bubbles in the deceleration portion to an outside of the exhaust heat recovery passage are disposed on the exhaust heat recovery passage.

2. The fuel cell system according to claim 1, wherein the bubble release portion is provided downstream of the heat exchanger.

3. The fuel cell system according to claim 1, further comprising a heater configured to heat the second heat medium flowing through the exhaust heat recovery passage, wherein
   the bubble release portion is provided downstream of a portion of the exhaust heat recovery passage which portion is heated by the heater.

4. The fuel cell system according to claim 3, wherein:
   the heater is a surplus electric power heater configured to use surplus electric power generated by the fuel cell;
   the deceleration portion is a buffer portion configured to suppress an increase in temperature of the second heat medium heated by the surplus electric power heater;
   the buffer portion is located downstream of a portion of the exhaust heat recovery passage which portion is heated by the surplus electric power heater; and
   a cross-sectional area of the buffer portion is larger than a cross-sectional area of the exhaust heat recovery passage located upstream of the buffer portion.

5. The fuel cell system according to claim 1, wherein:
   the deceleration portion is constituted by a portion of the exhaust heat recovery passage which portion extends downward in a vertical direction and through which the second heat medium flows downward; and a cross-sectional area of the portion of the exhaust heat recovery passage is larger than a cross-sectional area of a portion located upstream of the portion of the exhaust heat recovery passage and a cross-sectional area of a portion located downstream of the portion of the exhaust heat recovery passage.

6. The fuel cell system according to claim 5, wherein the bubble release portion is provided above the deceleration portion.

7. The fuel cell system according to claim 5, wherein the deceleration portion is configured such that the flow velocity of the second heat medium is $1.06 \times 10^{-1}$ m/sec or lower in at least a part of the deceleration portion.

8. The fuel cell system according to claim 1, wherein a portion of the exhaust heat recovery passage which portion is a portion other than the deceleration portion and extends downward is configured such that the flow velocity of the second heat medium is $4.25 \times 10^{-1}$ m/sec or higher.

9. The fuel cell system according to claim 1, wherein the second heat medium is water, the fuel cell system further comprising a hot water tank configured to store the second heat medium which has exchanged heat with the first heat medium by the heat exchanger.

10. The fuel cell system according to claim 1, wherein said first heat medium comprises a liquid.

11. The fuel cell system according to claim 1, wherein said second heat medium comprises a liquid.

12. The fuel cell system according to claim 1, wherein said cooling passage forms a closed loop through which said first heat medium flows.

13. The fuel cell system according to claim 1, wherein said exhaust heat recovery passage forms a closed loop through which said second heat medium flows.

* * * * *